(12) United States Patent
Wang et al.

(10) Patent No.: US 12,548,274 B2
(45) Date of Patent: Feb. 10, 2026

(54) METHOD, DEVICE, AND COMPUTER PROGRAM PRODUCT FOR GENERATING 3D OBJECT RECONSTRUCTION MODEL

(71) Applicant: Dell Products L.P., Round Rock, TX (US)

(72) Inventors: Zijia Wang, London (GB); Zhisong Liu, Shenzhen (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 121 days.

(21) Appl. No.: 18/581,670

(22) Filed: Feb. 20, 2024

(65) Prior Publication Data
US 2025/0245946 A1 Jul. 31, 2025

(30) Foreign Application Priority Data
Jan. 26, 2024 (CN) .......................... 202410114542.5

(51) Int. Cl.
*G06T 19/20* (2011.01)
*G06T 7/40* (2017.01)
(Continued)

(52) U.S. Cl.
CPC ............... *G06T 19/20* (2013.01); *G06T 7/40* (2013.01); *G06T 7/50* (2017.01); *G06T 7/73* (2017.01);
(Continued)

(58) Field of Classification Search
CPC .. G06T 19/20; G06T 7/40; G06T 7/50; G06T 7/73; G06T 17/00; G06T 2207/20081;
(Continued)

(56) References Cited

U.S. PATENT DOCUMENTS 11,308,657 B1 *  4/2022  Berlin ..................... G06N 3/04
11,580,395 B2 *  2/2023  Karras ................... H04N 19/20
(Continued)

OTHER PUBLICATIONS

A. T. Tran et al., "Regressing Robust and Discriminative 3D Morphable Models with a Very Deep Neural Network," Proceedings of the IEEE Conference on Computer Vision and Pattern Recognition, Dec. 15, 2016, pp. 5163-5172.
(Continued)

*Primary Examiner* — Motilewa Good-Johnson
(74) *Attorney, Agent, or Firm* — Ryan, Mason & Lewis, LLP (57) ABSTRACT

The present disclosure relates to a method, a device, and a computer program product for generating a three-dimensional (3D) object reconstruction model. The method includes acquiring an input image containing a two-dimensional (2D) object. The method further includes determining a shape feature, a texture feature, and a posture feature of the 2D object. The method further includes generating a rendered image based on the shape feature, the texture feature, the posture feature, and the input image. The method further includes generating a 3D object reconstruction model based on the input image and the rendered image, and tuning the 3D object reconstruction model according to a parameter tuning model for stylization. The 3D object reconstruction model generated by this method can realistically reconstruct the 2D object in terms of the shape, the texture, and the posture, so that the 3D object outputted from the model can better match the input image.

20 Claims, 6 Drawing Sheets

(51) Int. Cl.
  *G06T 7/50* (2017.01)
  *G06T 7/73* (2017.01)
  *G06T 17/00* (2006.01)
  *G06V 10/774* (2022.01)
  *G06V 10/776* (2022.01)
  *G06V 40/16* (2022.01)

(52) U.S. Cl.
  CPC .... *G06T 17/00* (2013.01); *G06T 2207/20081* (2013.01); *G06T 2207/20084* (2013.01); *G06T 2207/30201* (2013.01); *G06T 2219/2024* (2013.01); *G06V 10/774* (2022.01); *G06V 10/776* (2022.01); *G06V 40/174* (2022.01)

(58) Field of Classification Search
  CPC . G06T 2207/20084; G06T 2207/30201; G06T 2219/2024; G06T 15/04; G06V 10/774; G06V 10/776; G06V 40/174
  See application file for complete search history.

(56) References Cited

U.S. PATENT DOCUMENTS

| | | | | |
|---|---|---|---|---|
| 11,734,890 | B2* | 8/2023 | Laine | G06T 7/97 345/420 |
| 11,861,475 | B2* | 1/2024 | Hu | G06N 20/10 |
| 12,392,665 | B1* | 8/2025 | Guan | G01J 5/061 |
| 12,400,631 | B2* | 8/2025 | Wang | G10L 13/04 |
| 2010/0214290 | A1* | 8/2010 | Shiell | G06T 17/20 345/420 |
| 2012/0301013 | A1* | 11/2012 | Gu | G06V 10/143 382/154 |
| 2021/0056348 | A1* | 2/2021 | Berlin | G06T 11/60 |
| 2022/0036635 | A1* | 2/2022 | Li | G06T 15/20 |
| 2022/0343522 | A1* | 10/2022 | Bi | G06T 17/20 |
| 2023/0005251 | A1* | 1/2023 | Take | G06N 20/00 |
| 2023/0243973 | A1* | 8/2023 | Hung | G06T 17/00 356/5.01 |
| 2024/0134937 | A1* | 4/2024 | Ni | G06F 18/217 |
| 2024/0169563 | A1* | 5/2024 | Wen | G06T 7/11 |
| 2024/0221316 | A1* | 7/2024 | Gorodissky | G06V 40/174 |
| 2024/0273871 | A1* | 8/2024 | Song | G06V 10/28 |
| 2024/0331322 | A1* | 10/2024 | Smith | G06V 10/945 |
| 2024/0404253 | A1* | 12/2024 | Raguram | G06V 10/776 |
| 2025/0245946 | A1* | 7/2025 | Wang | G06T 7/40 |

OTHER PUBLICATIONS

K. Genova et al., "Unsupervised Training for 3D Morphable Model Regression," Proceedings of the IEEE Conference on Computer Vision and Pattern Recognition, Jun. 2018, pp. 8377-8386.

L. Tran et al., "Towards High-Fidelity Nonlinear 3D Face Morphable Model," Proceedings of the IEEE Conference on Computer Vision and Pattern Recognition, Apr. 9, 2019, pp. 1126-1135.

V. Blanz et al., "A Morphable Model for the Synthesis of 3D Faces," Proceedings of the 26th Annual Conference on Computer Graphics and Interactive Techniques, Jul. 1999, 8 pages.

I. Kemelmacher-Shlizerman et al., "Face Reconstruction in the Wild," International Conference on Computer Vision (ICCV), Nov. 2011, 8 pages.

J. Johnson et al., "Perceptual Losses for Real-time Style Transfer and Super-resolution," European Conference on Computer Vision, Sep. 17, 2016, 17 pages.

K. Simonyan et al., "Very Deep Convolutional Networks for Large-Scale Image Recognition," International Conference on Learning Representations, arXiv:1409.1556v6, Apr. 10, 2015, 14 pages.

A. Mollahosseini et al., "AffectNet: A Database for Facial Expression, Valence, and Arousal Computing in the Wild," arXiv:1708.03985v4, Oct. 9, 2017, 18 page.

T. Gerig et al., "Morphable Face Models—An Open Framework," arXiv:1709.08398v2, Sep. 26, 2017, 8 pages.

* cited by examiner

METHOD, DEVICE, AND COMPUTER PROGRAM PRODUCT FOR GENERATING 3D OBJECT RECONSTRUCTION MODEL

RELATED APPLICATION

The present application claims priority to Chinese Patent Application No. 202410114542.5, filed Jan. 26, 2024, and entitled "Method, Device, and Computer Program Product for Generating 3D Object Reconstruction Model," which is incorporated by reference herein in its entirety.

FIELD

Embodiments of the present disclosure relate to the field of image processing and, more specifically, to a method, a device, and a computer program product for generating a 3D object reconstruction model.

BACKGROUND

With the on-going development of image processing techniques, three-dimensional (3D) face reconstruction technology has become increasingly popular in computer vision, which has a wide range of applications including computer graphics, games, virtual reality, biometrics, human-computer interaction, and numerous others. In addition, 3D face reconstruction technology is of great significance in promoting the development of face recognition applications relating to cognitive science, physiology, and psychology.

In some applications, 3D face reconstruction technology involves reconstruction of a 3D face model of a subject individual according to one or more of his/her face images. During a 3D face reconstruction process, various factors of the face images, such as camera parameters, illumination conditions, background clutter, compression artifacts, and the like, may have an impact on the reconstructed 3D face.

SUMMARY

Embodiments of the present disclosure provide a method, a device, and a computer program product for generating a 3D object reconstruction model.

In a first aspect of embodiments of the present disclosure, a method for generating a 3D object reconstruction model is provided. The method includes acquiring an input image comprising a two-dimensional (2D) object. The method further includes determining a shape feature, a texture feature, and a posture feature of the 2D object. The method further includes generating a rendered image based on the shape feature, the texture feature, the posture feature, and the input image. The method further includes generating a 3D object reconstruction model based on the input image and the rendered image. The method further includes tuning the 3D object reconstruction model according to a parameter tuning model for stylization.

In a second aspect of embodiments of the present disclosure, an electronic device is provided. The electronic device includes at least one processor, and a memory coupled to the at least one processor and having instructions stored therein, wherein the instructions, when executed by the at least one processor, cause the electronic device to perform actions. The actions include acquiring an input image comprising a 2D object, determining a shape feature, a texture feature, and a posture feature of the 2D object, generating a rendered image based on the shape feature, the texture feature, the posture feature, and the input image, generating a 3D object reconstruction model based on the input image and the rendered image, and tuning the 3D object reconstruction model according to a parameter tuning model for stylization.

In a third aspect of embodiments of the present disclosure, a computer program product is provided. The computer program product is tangibly stored on a non-transitory computer-readable medium and comprises machine-executable instructions, wherein the machine-executable instructions, when executed by a machine, cause the machine to perform actions. The actions include acquiring an input image comprising a 2D object, determining a shape feature, a texture feature, and a posture feature of the 2D object, generating a rendered image based on the shape feature, the texture feature, the posture feature, and the input image, generating a 3D object reconstruction model based on the input image and the rendered image, and tuning the 3D object reconstruction model according to a parameter tuning model for stylization.

It should be understood that the content described in this Summary is neither intended to limit key or essential features of embodiments of the present disclosure, nor intended to limit the scope of the present disclosure. Other features of the present disclosure will become readily understood from additional description herein.

BRIEF DESCRIPTION OF THE DRAWINGS

The above and other features, advantages, and aspects of embodiments of the present disclosure will become more apparent in conjunction with the accompanying drawings and with reference to the following Detailed Description. In the accompanying drawings, identical or similar reference numerals represent identical or similar elements, in which.

In all the accompanying drawings, identical or similar reference numerals indicate identical or similar elements.

DETAILED DESCRIPTION

Illustrative embodiments of the present disclosure will be described below in further detail with reference to the accompanying drawings. Although the accompanying drawings show some embodiments of the present disclosure, it should be understood that the present disclosure may be implemented in various forms, and should not be construed as being limited to the embodiments stated herein. Rather, these embodiments are provided for understanding the present disclosure more thoroughly and completely. It should be understood that the accompanying drawings and embodiments of the present disclosure are for exemplary purposes only, and are not intended to limit the scope of protection of the present disclosure.

In the description of embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects, unless explicitly illustrated. Other explicit and implicit definitions may also be included below.

For 3D objects, such as a human face, the face shape and texture of the face are highly variable and complex depending on the identity, expression, posture, age, gender, and/or other characteristics of the person. In general, 3D object reconstruction can be realized based on deep learning methods, and during the reconstruction process, a convolutional neural network can be used to reconstruct 2D object images into a 3D object model. In such a method, a convolutional neural network is trained using a large dataset of 3D real object models and then fine-tuned on real object models with sparse landmarks. This method can process object images with any postures and expressions, but it requires alignment of objects with landmarks, while ground-truth 3D face shapes are scarce and expensive, and specialized devices such as laser scanners and structured light systems are required.

Another method uses autoencoders to learn the low-dimensional latent space of a 3D object shape, but this method relies on fixed camera models and lighting conditions. There is also another method, which uses an adversarial network for 3D object reconstruction, where the adversarial network is trained on a dataset of real objects and is self-supervised in terms of multi-view consistency and perceptual loss, but this method requires training on multiple views of the same object in order to generate a high-quality 3D object. Thus, so far, 3D object reconstruction has been limited in terms of expressiveness and realism, relying on realistic image factors, fixed templates, and a priori knowledge.

For this reason, embodiments of the present disclosure provide a solution for generating a 3D object reconstruction model. This solution in some embodiments illustratively involves determining a shape feature, a texture feature, and a posture feature of a 2D object in an input image, generating a rendered image according to the shape feature, the texture feature, and the posture feature of the 2D object, and generating a 3D object reconstruction model according to a comparison between the rendered image and the input image. The 3D object reconstruction model generated by this method can realistically reconstruct the 2D object in terms of the shape, the texture, and the posture, so that the 3D object outputted from the model can match the input image in the various dimensions, thus obtaining a high-credibility and high-quality 3D object. In addition, this solution further fine-tunes the 3D object reconstruction model by means of a parameter tuning model for stylization, through which stylistically diverse 3D object reconstruction models can be generated by combining knowledge from specific stylistic domains to improve the variability of the generated models.

Figure 1:
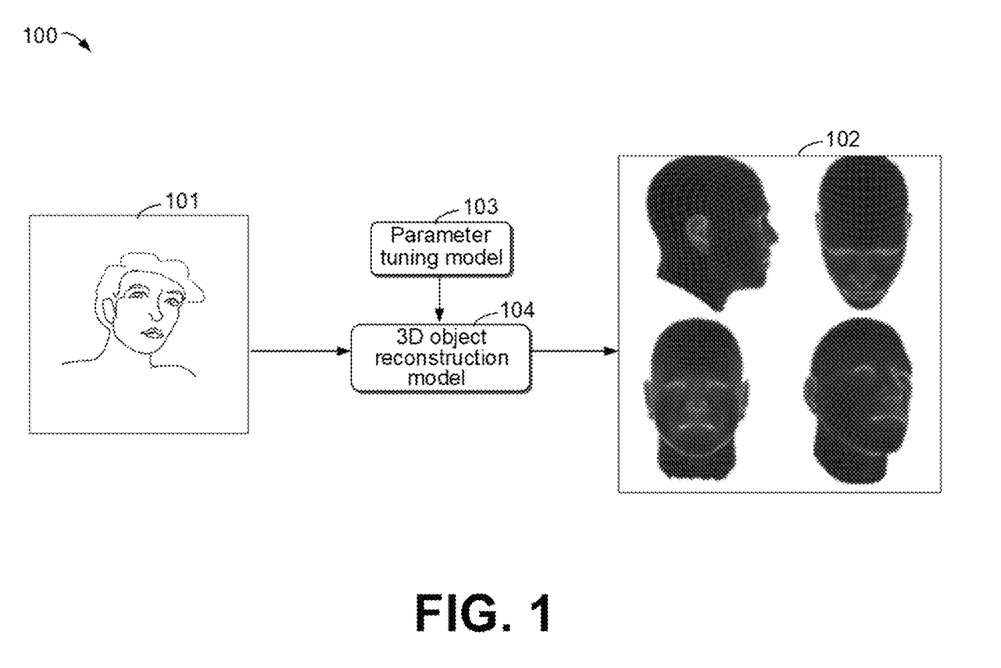
FIG. 1 is a schematic diagram of an example environment in which a plurality of embodiments of the present disclosure can be implemented.

FIG. 1 is a schematic diagram of an example environment 100 in which a plurality of embodiments of the present disclosure can be implemented. As shown in FIG. 1, the example environment 100 may include an input image 101 and a 3D object reconstruction model 104, the input image 101 comprising a 2D object. In particular implementations, the input to the 3D object reconstruction model 104 may be a plurality of images or may be a video, and the 3D object reconstruction model 104 is used to convert the 2D object in the input image 101 into a 3D object 102 that matches it, and the object may be a human face. The 3D object reconstruction model 104 may be a machine learning model. A machine learning model is a computational model that has some capability after learning over samples, which can be specifically a neural network, such as a convolutional neural network (CNN), a recurrent neural network (RNN), or the like. Of course, other types of models can be used as machine learning models in embodiments of the present disclosure, and the architecture and functionality in the example environment 100 are described herein for example purposes only.

In some embodiments, the 3D object reconstruction model 104 may include a shape parameter, a texture parameter, and a posture parameter, and after the input image 101 is inputted into the 3D object reconstruction model 104, the 3D object reconstruction model 104 may determine the shape feature, the texture feature, and the posture feature in the input image 101. During the training process of the 3D object reconstruction model 104, a rendered image with realistic lighting and shadow effects can be generated according to the shape feature, the texture feature, and the posture feature, and the rendered image can be generated using rasterization, ray tracing, neural rendering, and other methods, which can be selected according to actual needs. By comparing the rendered image with the input image 101, a pixel-level intensity difference between the two images can be obtained as a means of optimizing the shape parameter, the texture parameter, and the posture parameter in the 3D object reconstruction model 104, so as to obtain the 3D object reconstruction model 104 with high quality of reconstruction, high expressive capability, and high credibility.

With continued reference to FIG. 1, the example environment 100 may further include a parameter tuning model 103 as illustrated. After the 3D object reconstruction model 104 is trained, the shape parameter, the texture parameter, and the posture parameter in the 3D object reconstruction model 104 are fine-tuned using the parameter tuning model 103 for purposes of stylization, so that the 3D object reconstruction model 104 is not only capable of reconstructing a high-credibility 3D object, but also capable of endowing the object with a preset style, for example, a sketch style, a cartoon image style, an oil painting style, or the like. The purpose of stylization can be achieved by having the parameter tuning model 103 pre-learn images or videos of the desired style.

As can be seen from the above description, the solution of some embodiments of the present disclosure illustratively involves generating a rendered image according to the shape feature, the texture feature, and the posture feature of the 2D object, and training a 3D object reconstruction model by comparing the rendered image with the input image. The 3D object reconstruction model generated by this method can realistically reconstruct the 2D object in terms of the shape, the texture, and the posture, so that the 3D object outputted from the model can match the input image in the various dimensions, thus obtaining a high-credibility and high-quality 3D object. In addition, this solution fine-tunes the 3D object reconstruction model by means of a parameter tuning model for stylization, through which stylistically diverse 3D object reconstruction models can be generated by combining knowledge from specific stylistic domains to improve the variability of the generated models.

It should be understood that description of the architecture and function in the example environment 100 is made for illustrative purposes only and does not imply any limitation to the scope of the present disclosure. Embodiments of the present disclosure may also be applied to other environments having different structures and/or functions.

Example processes and devices according to embodiments of the present disclosure will be described in detail below with reference to FIGS. 2 to 6. For ease of understanding, the specific embodiments and associated functionality mentioned in the following description are all illustrative and are not intended to limit the scope of protection of the present disclosure. It should be understood that the embodiments described below may also include additional actions not shown and/or may omit actions shown, and the scope of the present disclosure is not limited in this regard.

Figure 2:
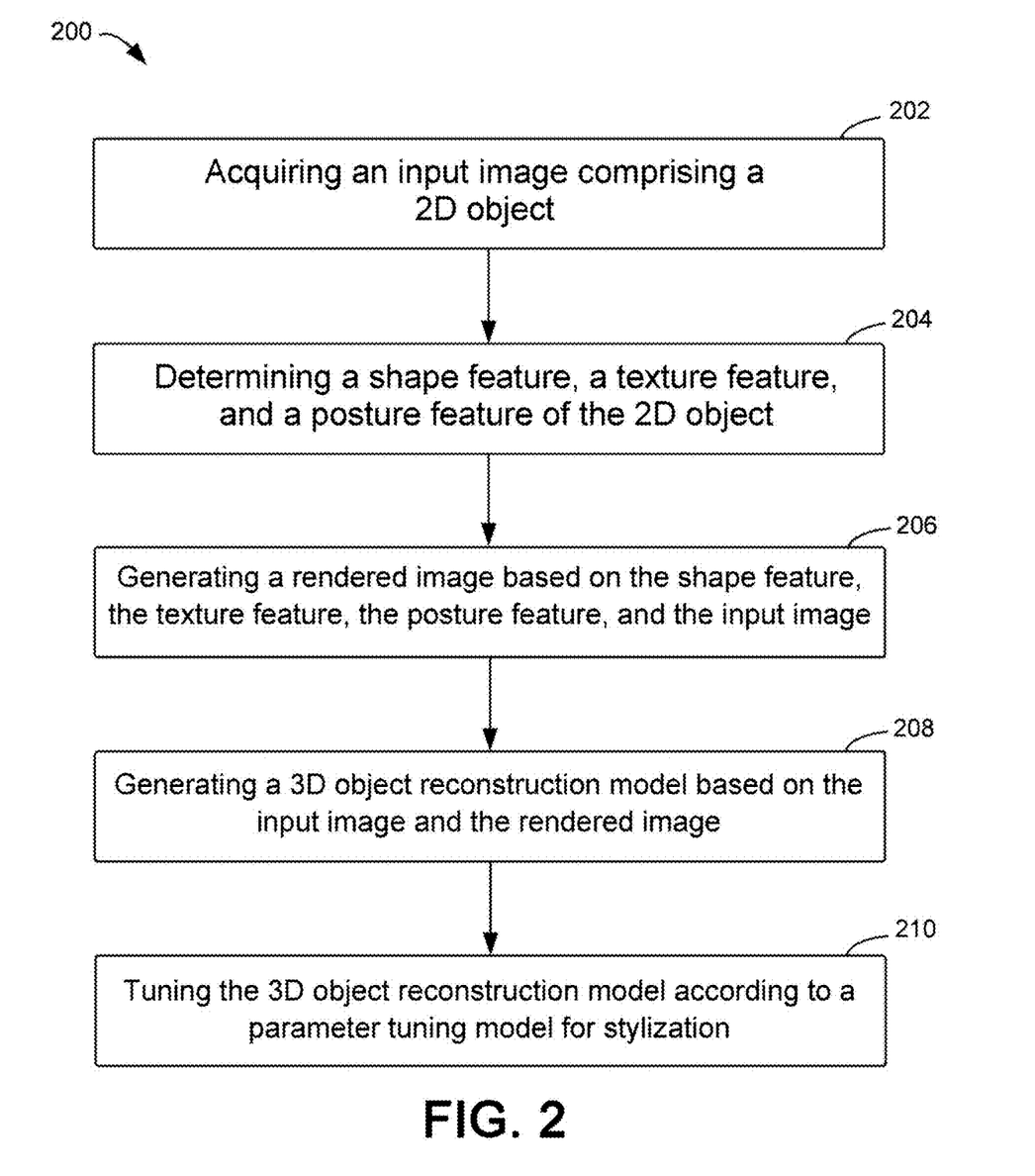
FIG. 2 is a flow chart of a method for generating a 3D object reconstruction model according to some embodiments of the present disclosure.

FIG. 2 is a flow chart of a method 200 for generating a 3D object reconstruction model according to some embodiments of the present disclosure. At block 202, an input image containing a 2D object is acquired. For example, as shown in FIG. 1, the input image 101 may be used as training data for the 3D object reconstruction model 104, and the 2D object may be a human face. The input image 101 may be a plurality of images, and the plurality of images may be a plurality of images including 2D faces with different angles and different postures, or images generated under different lighting conditions and different camera parameters. In embodiments of the present disclosure, there is no restriction on the environmental condition under which the input image 101 is generated, and there is no restriction on the presence or absence of occlusion for the 2D object in the input image 101, and shape aggregation can be performed using complementary information from different images to perform multi-image object reconstruction.

At block 204, a shape feature, a texture feature, and a posture feature of the 2D object are determined. For example, as shown in FIG. 1, the shape feature, the texture feature, and the posture feature of the 2D object in the input image 101 are determined, and the determined shape feature, texture feature, and posture feature are used as training data for the 3D object reconstruction model 104, so that the 3D object reconstruction model 104 obtained through training can reconstruct a 3D object that matches the inputted 2D object in a plurality of dimensions, such as the shape, the texture, and the posture, thereby improving the quality of reconstruction, the expressive capability, and the credibility of the 3D object reconstruction model 104.

At block 206, a rendered image is generated based on the shape feature, the texture feature, the posture feature, and the input image. For example, as shown in FIG. 1, during the training process of the 3D object reconstruction model 104, a rendered image with realistic lighting and shadow effects can be generated according to the shape feature, the texture feature, and the posture feature, and the rendered image can be generated using rasterization, ray tracing, neural rendering, and other methods, which can be selected according to actual needs.

At block 208, a 3D object reconstruction model is generated based on the input image and the rendered image. For example, as shown in FIG. 1, by comparing the rendered image with the input image 101, a pixel-level intensity difference between the two images can be obtained, and the shape parameter, the texture parameter, and the posture parameter in the 3D object reconstruction model 104 can be tuned by minimizing the intensity difference, so that the 3D object 102 outputted by the 3D object reconstruction model 104 can be made to match the input image 101 in multiple dimensions, such as the shape, the texture, and the posture. That is, the 3D object reconstruction model 104 obtained through training using the method of the present disclosure can generate more realistic and expressive 3D objects.

At block 210, the 3D object reconstruction model is tuned according to a parameter tuning model for stylization. For example, as shown in FIG. 1, in order to improve the expressiveness and variability of the 3D object reconstruction model 104, the present disclosure uses the parameter tuning model 103 to tune the parameters in the 3D object reconstruction model 104 for the purpose of stylization. In the present disclosure, the shape parameter, the texture parameter, and the posture parameter in the 3D object reconstruction model 104 are fine-tuned using the parameter tuning model 103 that is used for stylization, so that the 3D object reconstruction model 104 is not only capable of reconstructing a high-credibility 3D object, but also capable of endowing the object with a preset style, for example, a sketch style, a cartoon image style, an oil painting style, or the like. The purpose of stylization can be achieved by having the parameter tuning model 103 pre-learn images or videos of the desired style.

In this manner, the generated 3D object reconstruction model can realistically reconstruct the 2D object in terms of the shape, the texture, and the posture, so that the 3D object outputted from the model can match the input image in the various dimensions, thus obtaining a high-credibility and high-quality 3D object. In addition, the present disclosure further fine-tunes the 3D object reconstruction model by means of a parameter tuning model for stylization, through which stylistically diverse 3D object reconstruction models can be generated by combining knowledge from specific stylistic domains to improve the variability and the expressiveness of the generated models.

Figure 3:
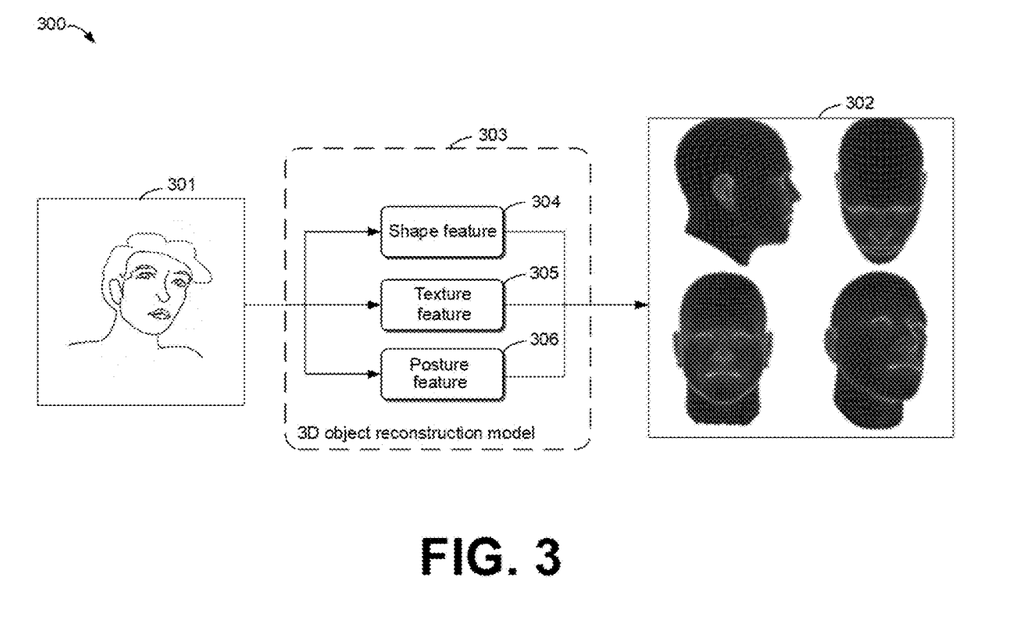
FIG. 3 is a schematic diagram of a process for determining a shape feature, a texture feature, and a posture feature according to some embodiments of the present disclosure.
Figure 4:
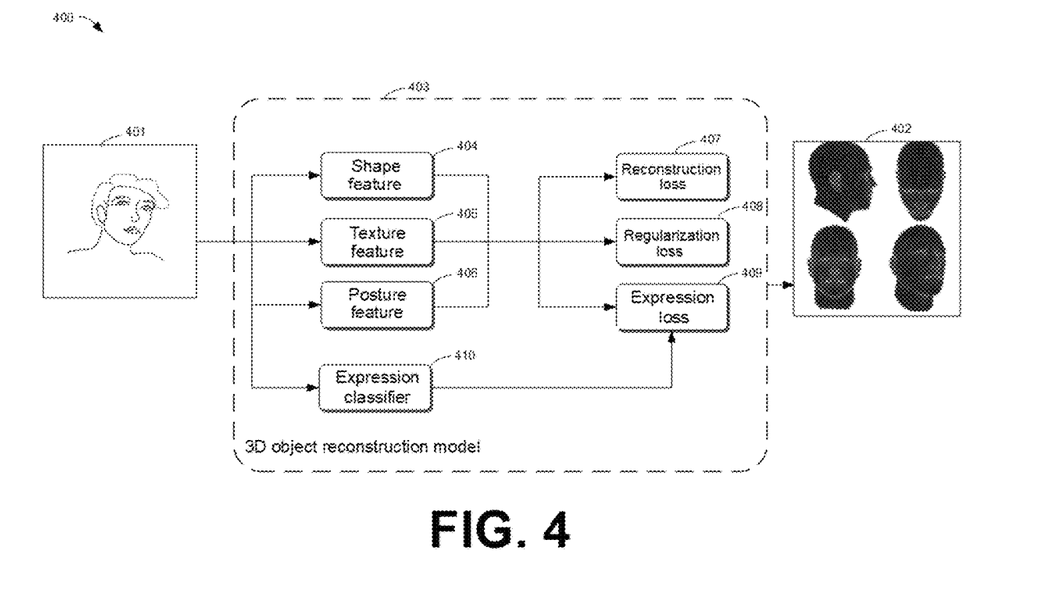
FIG. 4 is a schematic diagram of a process for generating a reconstruction loss, an expression loss, and a regularization loss according to some embodiments of the present disclosure.
Figure 5:
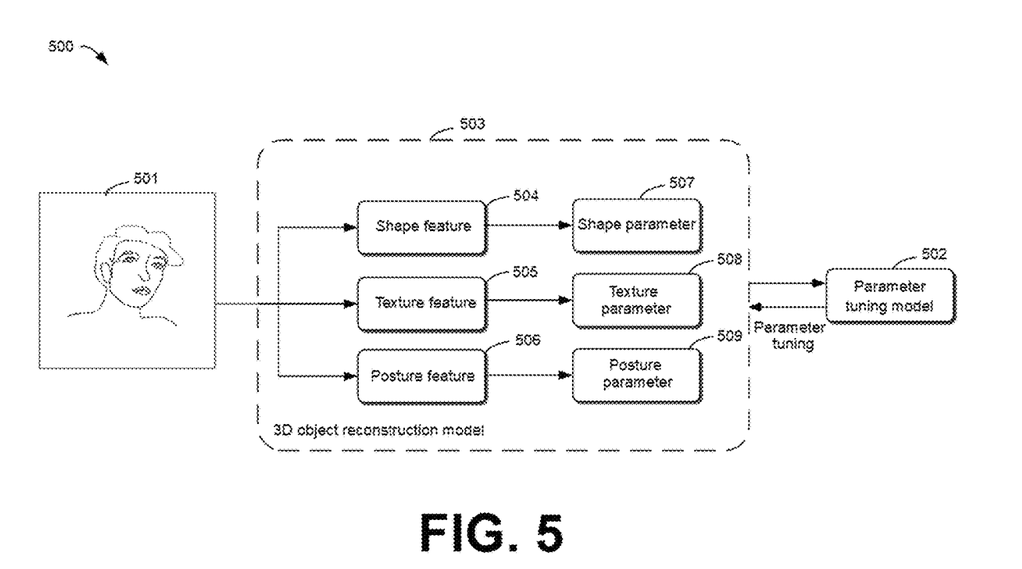
FIG. 5 is a schematic diagram of a process for tuning the 3D object reconstruction model according to some embodiments of the present disclosure.

The process of generating a 3D object reconstruction model will be specifically described below in conjunction with FIGS. 3 to 6. In embodiments of the present disclosure, explanatory illustrations are provided in the order of feature determination, model loss determination, and model stylization, wherein FIGS. 3 to 4 illustrate schematic diagrams of generating a 3D object reconstruction model, and FIG. 5 is a schematic diagram of a stylized 3D object reconstruction model. Again, the specific embodiments and associated functionality referred to in the following description are exemplary and are not intended to limit the scope of protection of the present disclosure. It should be understood that the embodiments described below may also include additional actions not shown and/or may omit actions shown, and the scope of the present disclosure is not limited in this regard.

FIG. 3 is a schematic diagram of a process 300 for determining a shape feature, a texture feature, and a posture feature of some embodiments of the present disclosure. After an input image 301 is inputted into a 3D object reconstruction model 303, the 3D object reconstruction model 303 generates a 3D object 302, and the 3D object reconstruction model 303 needs to be trained in order to match the 3D object 302 as closely as possible to the 2D object in the input image 301. In some embodiments, a shape feature 304, a texture feature 305, and a posture feature 306 of the 2D object in the input image 301 may be determined, and the determined shape feature 304, texture feature 305, and posture feature 306 may be used as training data for the 3D object reconstruction model 303.

In embodiments of the present disclosure, the shape feature 304 may be determined from an average object shape feature and an identity feature and an expression feature of the 2D object:

$$S = \overline{S} + A_i\alpha_i + A_e\alpha_e \qquad (1)$$

where S denotes the shape feature, $\overline{S}$ denotes the average object shape feature, $\alpha_i$ denotes the identity parameter, $\alpha_e$ denotes the expression parameter, $A_i$ denotes the identity basis matrix with $K_i$ columns, and $A_e$ denotes the expression basis matrix with $K_e$ columns. The shape parameters in the 3D object reconstruction model 303 may include the expression parameter $\alpha_e$ and the identity parameter $\alpha_i$, and the average object shape feature $\overline{S}$ is specifically an average shape feature learned over a very large number of 3D objects.

The texture feature 305 may be determined according to an average object texture feature and a constant feature of the 2D object:

$$T = \overline{T} + B_i\beta_i \qquad (2)$$

where T denotes the texture feature, $\overline{T}$ denotes the average object texture feature, $B_i$ denotes the constant basis matrix, and $\beta_i$ denotes the texture parameter. The average object texture feature $\overline{T}$ is specifically an average texture feature learned over a very large number of 3D objects.

The posture feature 306 may be determined according to a rotation feature, a scaling feature, and a translation feature of the 2D object:

$$R = sR_x(\theta_x)R_y(\theta_y)R_z(\theta_z) + t \qquad (3)$$

where R denotes the posture feature, $R_x$ denotes the rotation matrix around the x-axis, $R_y$ denotes the rotation matrix around the y-axis, $R_z$ denotes the rotation matrix around the z-axis, $\theta_x$ denotes the angle of rotation around the x-axis, $\theta_y$ denotes the angle of rotation around the y-axis, $\theta_z$ denotes the angle of rotation around the z-axis, s denotes the scaling factor, and t denotes the translation feature.

FIG. 4 is a schematic diagram of a process 400 for generating a reconstruction loss, an expression loss, and a regularization loss according to some embodiments of the present disclosure. In some embodiments, a 3D object reconstruction model 403 generates a 3D object 402 after acquiring an input image 401, and the 3D object reconstruction model 403 needs to be trained in order to make the 3D object 402 match as closely as possible with the 2D object in the input image 401. After a shape feature 404, a texture feature 405, and a posture feature 406 have been determined, the 3D object reconstruction model 403 may be trained according to a reconstruction loss 407 for measuring a pixel intensity difference, a regularization loss 408 for measuring object plausibility, and an expression loss 409 for measuring an emotional expression.

In some embodiments, the rendered image may be determined according as:

$$I_r = \text{Render}(I_i, S, T, R) \qquad (4)$$

where $I_r$ denotes the rendered image, Render denotes the rendering function, $I_i$ denotes the input image, S denotes the shape feature, T denotes the texture feature, and R denotes the posture feature. The reconstruction loss 407 may be determined according to the rendered image $I_r$ and the input image $I_i$:

$$L_{rec} = \lambda_1|I - I_r|_1 + \lambda_2|F(I) - F(I_r)|_1 \qquad (5)$$

where $L_{rec}$ denotes the reconstruction loss, $\lambda_1$ denotes a first weight, $\lambda_2$ denotes a second weight, and F denotes feature extraction. In particular implementations, a feature extractor that computes high-level features in an image or video may be used to extract an input feature $F(I_i)$ in the input image $I_i$ and a rendered feature $F(I_r)$ in the rendered image $I_r$. The reconstruction loss $L_{rec}$ is generated through the input image $I_i$, the rendered image $I_r$, the input feature $F(I_i)$, and the rendered feature $F(I_r)$, so that the 3D object reconstruction model 403 is supervised using both low-level and perceptual-level information during training in order to improve the clarity and accuracy of the 3D object reconstruction.

In some embodiments, the expression loss 409 may be generated by a real expression label of the 2D object and an emotional expression coefficient in the 3D object reconstruction model 403:

$$L_{exp} = -\sum_{c=1}^{C} y_c \log p_c \qquad (6)$$

where $L_{exp}$ denotes the expression loss, C denotes the number of expressions, $y_c$ denotes the expression coefficient, and $p_c$ denotes the real expression label. In embodiments of the present disclosure, six basic expressions are used, for example, anger, disgust, fear, happiness, sadness, and surprise. It can be understood that the maximum value of C is 6. Of course, other kinds of expressions can also be set, which can be chosen according to actual needs.

As shown in FIG. 4, an expression classifier 410 may be provided in the 3D object reconstruction model 403. The expression classifier 410 extracts the real expression label of the 2D object, and a pre-trained CNN model may be selected as the expression classifier 410. The 3D object reconstruction model 403 can obtain the expression coefficient according to the extracted features of the 2D object, and by calculating the expression coefficient and the cross-entropy loss of the real expression label, i.e., the expression loss $L_{exp}$, the expression accuracy of the generated 3D object 402 can be improved.

In some embodiments, the regularization loss 408 may be generated by the average shape feature, the average texture feature, the average posture feature, the shape feature S, the texture feature T, and the posture feature R:

$$L_{reg} = \frac{1}{2}|\alpha_i - \mu_i|_2^2 + \frac{1}{2}|\alpha_e - \mu_e|_2^2 + \frac{1}{2}|\beta_i - \mu_t|_2^2 + U(s, \theta_x, \theta_y, \theta_z, t) \qquad (7)$$

where $L_{reg}$ denotes the regularization loss, $\mu_i$ denotes the average identity feature, $\mu_e$ denotes the expression identity feature, $\mu_t$ denotes the average texture feature, and U denotes a uniform distribution with a predetermined range of the posture parameter. The average identity feature $\mu_i$ is the identity feature learned over a very large number of 3D objects, the average expression feature $\mu_e$ is the expression feature learned over a very large number of 3D objects, and the average texture feature $\mu_t$ is the texture feature learned over a very large number of 3D objects. The regularization loss $L_{reg}$ measures the extent of the prior distributions of the shape parameter, the texture parameter, and the posture parameter in the 3D object reconstruction model 403, which have been learned from a large dataset. Among them, the shape parameter includes an expression parameter $\alpha_e$ and an identity parameter $\alpha_i$, the texture parameter includes a texture parameter $\beta_i$, and the posture parameter includes an angle of rotation $\theta_x$ around the x-axis, an angle of rotation $\theta_y$ around the y-axis, an angle of rotation $\theta_z$ around the z-axis, a scaling factor s, and a translation feature t.

In some embodiments, the 3D object reconstruction model 403 has a total loss function given by:

$$L_{tot} = L_{rec} + \lambda_3 L_{exp} + \lambda_4 L_{reg} \qquad (8)$$

where $L_{tot}$ denotes the total loss, $\lambda_3$ denotes a third weight, and $\lambda_4$ denotes a fourth weight. In this manner, the generated 3D object reconstruction model can realistically reconstruct the 2D object in terms of the shape, the texture, and the posture, so that the 3D object outputted from the model can match the input image in the various dimensions, thus obtaining a high-credibility and high-quality 3D object.

FIG. 5 is a schematic diagram of a process 500 for tuning the 3D object reconstruction model according to some embodiments of the present disclosure. A 3D object reconstruction model 503 determines a shape feature 504, a texture feature 505, and a posture feature 506 after acquiring an input image 501. Based on the determined features, a shape parameter 507, a texture parameter 508, and a posture parameter 509 are optimized, so as to train the 3D object reconstruction model 503. After the 3D object reconstruction model 503 is trained, the shape parameter 507, the texture parameter 508, and the posture parameter 509 in the 3D object reconstruction model 503 are fine-tuned using a parameter tuning model 502 that is used for stylization, so that the 3D object reconstruction model 503 is not only capable of reconstructing a high-credibility 3D object, but also capable of endowing the object with a preset style, for example, a sketch style, a cartoon image style, an oil painting style, or the like. The purpose of stylization can be achieved by having the parameter tuning model 502 pre-learn images or videos of the desired style.

The parameter tuning model 502 may be a machine learning model that stylizes the 3D object reconstruction model 503, and in some embodiments, the parameter tuning model 502 may be a Bayesian model. The process of parameter tuning may use the input image $I_i$, the rendered image $I_r$, and the style label y of the parameter tuning model as observed variables. The shape feature, the texture feature, and the posture feature are tuned by maximizing the lower bound of the log marginal likelihood of the observed variables so as to tune the 3D object reconstruction model.

As described above, the 3D object reconstruction model 503 includes the expression parameter $\alpha_e$, the identity parameter $\alpha_i$, the texture parameter $\beta_i$, the angle of rotation $\theta_x$ about the x-axis, the angle of rotation $\theta_y$ about the y-axis, the angle of rotation $\theta_z$ about the z-axis, the scaling factor s, and the translation feature t. The above parameters can be used as the latent variables of the observed variables, and the prior distribution of the latent variables can be denoted as $p(\alpha_i)$, $p(\alpha_e)$, $p(\beta_i)$, $p(s)$, $p(\theta_x)$, $p(\theta_y)$, $p(\theta_z)$, and $p(t)$, the likelihood function of the observed variables can be denoted as $p(I|I_r)$, $p(y|\alpha_e)$, and $p(I_r|\alpha_i, \alpha_e, \beta_i, s, \theta_x, \theta_y, \theta_z, t)$, the posterior distribution of the latent variables can be denoted as $q(\alpha_i|I, y, I_r)$, $q(\alpha_e|I, y, I_r)$, $q(\beta_i|I, y, I_r)$, $q(s|I, y, I_r)$, $q(\theta_x|I, y, I_r)$, $q(\theta_y|I, y, I_r)$, $q(\theta_z|I, y, I_r)$, and $q(t|I, y, I_r)$, and maximizing the lower bound of the log marginal likelihood of the observed variables can be denoted as:

$$\log p(I, y, I_r) \geq \mathbb{E}_q [\log p(I, y, I_r|\alpha_i, \alpha_e, \beta_i, s, \theta_x, \theta_y, \theta_z, t)] - KL(q\|p) \qquad (9)$$

where $\mathbb{E}_q$ denotes the expectation of the posterior distribution of all the parameters, and $KL(q\|p)$ denotes the Kullback-Leibler scatter between q and p. To approximate q with a processable family of distributions, the present disclosure uses the mean-field approximation, which assumes that q factorizes all the latent variables:

$$\begin{aligned} q(\alpha_i, \alpha_e, \beta_i, s, \theta_x, \theta_y, \theta_z, t|I, y, I_r) = \qquad (10) \\ q(\alpha_i|I, y, I_r) q(\alpha_e|I, y, I_r) q(\beta_i|I, y, I_r) q(s|I, y, I_r) \\ q(\theta_x|I, y, I_r) q(\theta_y|I, y, I_r) q(\theta_z|I, y, I_r) q(t|I, y, I_r) \end{aligned}$$

After factorization, it is further assumed that each factorization distribution is a Gaussian distribution with a diagonal covariance matrix:

$$q(z|I, y, I_r) = \mathcal{N}\left(z|\mu_z(I, y, I_r), \sum\nolimits_z(I, y, I_r)\right) \qquad (11)$$

where z denotes any latent variable, $\mu_z$ denotes the mean of the latent variable when mapped to the Gaussian distribution, and $\Sigma_z$ denotes the covariance of the latent variable when mapped to the Gaussian distribution.

In some embodiments, to tune the above parameters, the parameter tuning model 502 of the present disclosure performs learning and tuning using a Bayesian deep neural network. The mean and the covariance of each latent variable are outputted according to the input image or video, and parameter tuning is performed by maximizing the lower bound of the log marginal likelihood of the observed variables by using the stochastic gradient descent method, and the parameter tuning model can be used to generate stylistically diverse 3D object reconstruction models by combining the knowledge of the specific stylistic domains, thereby improving the variability of the generated models.

Figure 6:
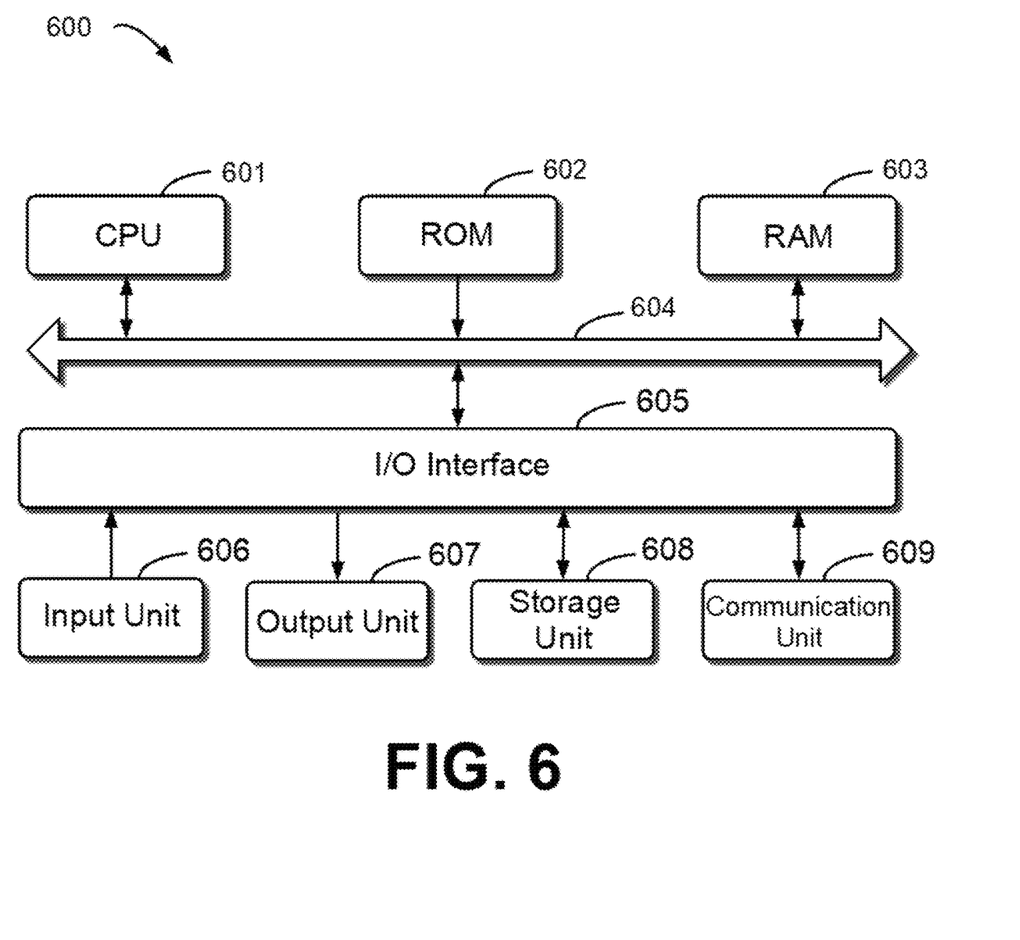
FIG. 6 is a block diagram of a device that can implement a plurality of embodiments of the present disclosure.

FIG. 6 is a block diagram of an example device 600 that can be used to implement embodiments of the present disclosure. As shown in the figure, the device 600 includes a computing unit 601, illustratively comprising a central processing unit (CPU), that can perform various appropriate actions and processing according to computer program instructions stored in a read-only memory (ROM) 602 or computer program instructions loaded from a storage unit 608 to a random access memory (RAM) 603. Various programs and data required for the operation of the device 600 may also be stored in the RAM 603. The computing unit 601, the ROM 602, and the RAM 603 are connected to each other through a bus 604. An input/output (I/O) interface 605 is also connected to the bus 604.

A plurality of components in the device 600 are connected to the I/O interface 605 and include: an input unit 606, such as a keyboard and a mouse; an output unit 607, such as various types of displays and speakers; the storage unit 608, such as a magnetic disk and an optical disc; and a communication unit 609, such as a network card, a modem, and a wireless communication transceiver. The communication unit 609 allows the device 600 to exchange information/data with other devices via a computer network, such as the Internet, and/or various telecommunication networks.

The computing unit 601 may be various general-purpose and/or special-purpose processing components with processing and computing power. Some examples of the computing unit 601 include, but are not limited to, the above-noted CPU, a graphics processing unit (GPU), various specialized artificial intelligence (AI) computing chips, various computing units for running machine learning model algorithms, a digital signal processor (DSP), and any appropriate processor, controller, microcontroller, and the like. The computing unit 601 performs various methods and processes described above, such as the method 200. For example, in some embodiments, the method 200 may be implemented as a computer software program that is tangibly included in a machine-readable medium, such as the storage unit 608. In some embodiments, part of or all the computer program may be loaded and/or installed onto the device 600 via the ROM 602 and/or the communication unit 609. When the computer program is loaded to the RAM 603 and executed by the computing unit 601, one or more steps of the method 200 described above may be performed. Alternatively, in other embodiments, the computing unit 601 may be configured to implement the method 200 in any other suitable manners (such as by means of firmware).

The functions described herein may be executed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Complex Programmable Logic Device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a RAM, a ROM, an erasable programmable read-only memory (EPROM or flash memory), an optical fiber, a portable compact disc read-only memory (CD-ROM), an optical storage device, a magnetic storage device, or any suitable combinations thereof. Additionally, although operations are depicted in a particular order, this should not be construed as an indication that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

What is claimed is:

1. A method comprising:
   acquiring an input image containing a two-dimensional (2D) object;
   determining a shape feature, a texture feature, and a posture feature of the 2D object;
   generating a rendered image based on the shape feature, the texture feature, the posture feature, and the input image;
   generating a 3D object reconstruction model based on the input image and the rendered image, wherein the 3D object reconstruction model is configured to generate a 3D object from the 2D object utilizing a weighted combination of multiple distinct loss functions including at least one loss function that is generated based on (i) estimated expression coefficients of the 3D object reconstruction model and (ii) an output of an expression classifier of the 3D object reconstruction model; and
   tuning the 3D object reconstruction model according to a parameter tuning model for stylization.

2. The method according to claim 1, wherein determining a shape feature, a texture feature, and a posture feature of the 2D object comprises:
   determining an average object shape feature, and an identity feature and an expression feature of the 2D object; and
   determining the shape feature based on the average object shape feature, the identity feature, and the expression feature as determined.

3. The method according to claim 1, wherein determining a shape feature, a texture feature, and a posture feature of the 2D object comprises:
   determining an average object texture feature and a constant feature of the 2D object; and
   determining the texture feature based on the average object texture feature and the constant feature of the 2D object as determined.

4. The method according to claim 1, wherein determining a shape feature, a texture feature, and a posture feature of the 2D object comprises:
  determining a rotation feature, a scaling feature, and a translation feature of the 2D object; and
  determining the posture feature based on the rotation feature, the scaling feature, and the translation feature as determined.

5. The method according to claim 1, wherein generating the 3D object reconstruction model comprises:
  determining a reconstruction loss for measuring a pixel intensity difference, an expression loss for measuring an emotional expression, and a regularization loss for measuring object plausibility based on the shape feature, the texture feature, and the posture feature; and
  generating the 3D object reconstruction model based on the reconstruction loss, the expression loss, and the regularization loss.

6. The method according to claim 5, wherein determining a reconstruction loss for measuring a pixel intensity difference, an expression loss for measuring an emotional expression, and a regularization loss for measuring object plausibility comprises:
  determining input features of the input image and rendered features of the rendered image; and
  generating the reconstruction loss based on the input image, the rendered image, the input features, and the rendered features.

7. The method according to claim 5, wherein determining a reconstruction loss for measuring a pixel intensity difference, an expression loss for measuring an emotional expression, and a regularization loss for measuring object plausibility comprises:
  generating an emotional expression coefficient based on the shape feature, the texture feature, and the posture feature;
  extracting a real expression label of the 2D object; and
  generating the expression loss based on the emotional expression coefficient and the real expression label.

8. The method according to claim 5, wherein determining a reconstruction loss for measuring a pixel intensity difference, an expression loss for measuring an emotional expression, and a regularization loss for measuring object plausibility comprises:
  determining an average shape feature, an average texture feature, and an average posture feature based on average features of the object; and
  generating the regularization loss based on the average shape feature, the average texture feature, the average posture feature, the shape feature, the texture feature, and the posture feature.

9. The method according to claim 1, wherein tuning the 3D object reconstruction model comprises:
  taking the input image, the rendered image, and a style label of the parameter tuning model as observed variables; and
  tuning the 3D object reconstruction model based on a lower bound of log marginal likelihood of the observed variables.

10. The method according to claim 1, further comprising:
  reconstructing the 2D object into a 3D object based on the tuned 3D object reconstruction model.

11. An electronic device, comprising:
  at least one processor; and
  memory coupled to the at least one processor and having instructions stored therein, wherein the instructions, when executed by the at least one processor, cause the electronic device to perform actions comprising:
  acquiring an input image containing a two-dimensional (2D) object;
  determining a shape feature, a texture feature, and a posture feature of the 2D object;
  generating a rendered image based on the shape feature, the texture feature, the posture feature, and the input image;
  generating a 3D object reconstruction model based on the input image and the rendered image, wherein the 3D object reconstruction model is configured to generate a 3D object from the 2D object utilizing a weighted combination of multiple distinct loss functions including at least one loss function that is generated based on (i) estimated expression coefficients of the 3D object reconstruction model and (ii) an output of an expression classifier of the 3D object reconstruction model; and
  tuning the 3D object reconstruction model according to a parameter tuning model for stylization.

12. The electronic device according to claim 11, wherein determining a shape feature, a texture feature, and a posture feature of the 2D object comprises:
  determining an average object shape feature, and an identity feature and an expression feature of the 2D object; and
  determining the shape feature based on the average object shape feature, the identity feature, and the expression feature as determined.

13. The electronic device according to claim 11, wherein determining a shape feature, a texture feature, and a posture feature of the 2D object comprises:
  determining an average object texture feature and a constant feature of the 2D object; and
  determining the texture feature based on the average object texture feature and the constant feature of the 2D object as determined.

14. The electronic device according to claim 11, wherein determining a shape feature, a texture feature, and a posture feature of the 2D object comprises:
  determining a rotation feature, a scaling feature, and a translation feature of the 2D object; and
  determining the posture feature based on the rotation feature, the scaling feature, and the translation feature as determined.

15. The electronic device according to claim 11, wherein generating the 3D object reconstruction model comprises:
  determining a reconstruction loss for measuring a pixel intensity difference, an expression loss for measuring an emotional expression, and a regularization loss for measuring object plausibility based on the shape feature, the texture feature, and the posture feature; and
  generating the 3D object reconstruction model based on the reconstruction loss, the expression loss, and the regularization loss.

16. The electronic device according to claim 15, wherein determining a reconstruction loss for measuring a pixel intensity difference, an expression loss for measuring an emotional expression, and a regularization loss for measuring object plausibility comprises:
  determining input features of the input image and rendered features of the rendered image; and
  generating the reconstruction loss based on the input image, the rendered image, the input features, and the rendered features.

17. The electronic device according to claim 15, wherein determining a reconstruction loss for measuring a pixel intensity difference, an expression loss for measuring an emotional expression, and a regularization loss for measuring object plausibility comprises:
  generating an emotional expression coefficient based on the shape feature, the texture feature, and the posture feature;
  extracting a real expression label of the 2D object; and
  generating the expression loss based on the emotional expression coefficient and the real expression label.

18. The electronic device according to claim 15, wherein determining a reconstruction loss for measuring a pixel intensity difference, an expression loss for measuring an emotional expression, and a regularization loss for measuring object plausibility comprises:
  determining an average shape feature, an average texture feature, and an average posture feature based on average features of the object; and
  generating the regularization loss based on the average shape feature, the average texture feature, the average posture feature, the shape feature, the texture feature, and the posture feature.

19. The electronic device according to claim 11, wherein tuning the 3D object reconstruction model comprises:
  taking the input image, the rendered image, and a style label of the parameter tuning model as observed variables; and
  tuning the 3D object reconstruction model based on a lower bound of log marginal likelihood of the observed variables.

20. A computer program product comprising a non-transitory computer-readable medium having machine-executable instructions stored therein, wherein the machine-executable instructions, when executed by a machine, cause the machine to perform actions comprising:
  acquiring an input image containing a two-dimensional (2D) object;
  determining a shape feature, a texture feature, and a posture feature of the 2D object;
  generating a rendered image based on the shape feature, the texture feature, the posture feature, and the input image;
  generating a 3D object reconstruction model based on the input image and the rendered image, wherein the 3D object reconstruction model is configured to generate a 3D object from the 2D object utilizing a weighted combination of multiple distinct loss functions including at least one loss function that is generated based on (i) estimated expression coefficients of the 3D object reconstruction model and (ii) an output of an expression classifier of the 3D object reconstruction model; and
  tuning the 3D object reconstruction model according to a parameter tuning model for stylization.

* * * * *